United States Patent
Uejima et al.

(10) Patent No.: US 9,944,193 B2
(45) Date of Patent: Apr. 17, 2018

(54) VEHICLE INCLUDING ELECTRIC POWER TRANSMISSION AND RECEPTION UNIT

(71) Applicant: TOYOTA JIDOSHA KABUSHIKI KAISHA, Toyota-shi, Aichi-ken (JP)

(72) Inventors: Taiyo Uejima, Toyota (JP); Shinji Ichikawa, Toyota (JP); Toru Nakamura, Toyota (JP); Satoshi Taniguchi, Toyota (JP); Shinpei Takita, Chiryu (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 53 days.

(21) Appl. No.: 15/026,665

(22) PCT Filed: Oct. 7, 2014

(86) PCT No.: PCT/JP2014/005102
§ 371 (c)(1),
(2) Date: Apr. 1, 2016

(87) PCT Pub. No.: WO2015/075859
PCT Pub. Date: May 28, 2015

(65) Prior Publication Data
US 2016/0250940 A1    Sep. 1, 2016

(30) Foreign Application Priority Data
Nov. 20, 2013  (JP) .................................. 2013-239798

(51) Int. Cl.
*B60L 11/18* (2006.01)
*B60K 6/365* (2007.10)
(Continued)

(52) U.S. Cl.
CPC .......... *B60L 11/1833* (2013.01); *B60K 6/26* (2013.01); *B60K 6/365* (2013.01); *B60K 6/40* (2013.01);
(Continued)

(58) Field of Classification Search
CPC .............. B60L 11/1833; B60L 11/1829; B60L 11/1838; B60L 11/182; F16H 63/483;
(Continued)

(56) References Cited

U.S. PATENT DOCUMENTS 7,741,734 B2    6/2010  Joannopoulos et al.
2004/0097329 A1*  5/2004  Chang .................... B60K 28/10
477/99
(Continued)

FOREIGN PATENT DOCUMENTS

AU    2006269374 B2    1/2007
AU    2007349874 A2    10/2008
(Continued)

*Primary Examiner* — Tuan C To
(74) *Attorney, Agent, or Firm* — Oliff PLC

(57) ABSTRACT

A vehicle includes an electric power reception unit, a motive power generation apparatus generating on an output shaft a drive force for moving the vehicle, and a vehicle ECU controlling the motive power generation apparatus. The motive power generation apparatus includes a parking gear provided on the output shaft, a parking pole having a protrusion to be fit in a groove of the parking gear, and a drive unit outputting the drive force. The vehicle ECU controls the drive unit so that in a case where the electric power reception unit is located within an area in which electric power can be received from the electric power transmission apparatus and where the motive power generation apparatus has been set to a parking range, the vehicle is moved in a direction that causes the electric power reception unit to approach the electric power transmission apparatus.

6 Claims, 6 Drawing Sheets

(51) Int. Cl.
  *B60K 6/445* (2007.10)
  *B60K 6/40* (2007.10)
  *B60K 6/26* (2007.10)
  *H02J 7/00* (2006.01)
  *H02J 7/02* (2016.01)
  *F16H 63/48* (2006.01)

(52) U.S. Cl.
  CPC ............ *B60K 6/445* (2013.01); *B60L 11/182* (2013.01); *B60L 11/1829* (2013.01); *B60L 11/1838* (2013.01); *F16H 63/483* (2013.01); *H02J 7/0027* (2013.01); *H02J 7/025* (2013.01); *B60Y 2200/92* (2013.01); *Y02T 10/7005* (2013.01); *Y02T 10/7072* (2013.01); *Y02T 10/7258* (2013.01); *Y02T 90/12* (2013.01); *Y02T 90/121* (2013.01); *Y02T 90/122* (2013.01); *Y02T 90/125* (2013.01); *Y02T 90/14* (2013.01); *Y10S 903/906* (2013.01); *Y10S 903/911* (2013.01); *Y10S 903/93* (2013.01); *Y10S 903/951* (2013.01)

(58) Field of Classification Search
  CPC .......... B60K 6/365; B60K 6/26; B60K 6/445; B60K 6/40; H02J 7/025; H02J 7/0027; Y02T 90/121; Y02T 90/122; Y02T 10/7005; Y02T 10/7072; Y02T 10/7258; Y02T 90/125; Y02T 90/12; Y02T 90/14; Y10S 903/906; B60Y 2200/92
  See application file for complete search history.

(56) References Cited

U.S. PATENT DOCUMENTS

| | | | |
|---|---|---|---|
| 2005/0014601 A1* | 1/2005 | Miura | B60K 6/365 477/2 |
| 2007/0087896 A1* | 4/2007 | Matsuzaki | F16H 61/12 477/107 |
| 2007/0213907 A1 | 9/2007 | Shimizu et al. | |
| 2007/0222542 A1 | 9/2007 | Joannopoulos et al. | |
| 2008/0278264 A1 | 11/2008 | Karalis et al. | |
| 2009/0195332 A1 | 8/2009 | Joannopoulos et al. | |
| 2009/0195333 A1 | 8/2009 | Joannopoulos et al. | |
| 2009/0224856 A1 | 9/2009 | Karalis et al. | |
| 2009/0241713 A1* | 10/2009 | Ito | F16D 1/06 74/473.1 |
| 2009/0267709 A1 | 10/2009 | Joannopoulos et al. | |
| 2009/0267710 A1 | 10/2009 | Joannopoulos et al. | |
| 2009/0271047 A1* | 10/2009 | Wakamatsu | H02J 5/005 700/295 |
| 2010/0096934 A1 | 4/2010 | Joannopoulos et al. | |
| 2010/0102639 A1 | 4/2010 | Joannopoulos et al. | |
| 2010/0102640 A1 | 4/2010 | Joannopoulos et al. | |
| 2010/0102641 A1 | 4/2010 | Joannopoulos et al. | |
| 2010/0117455 A1 | 5/2010 | Joannopoulos et al. | |
| 2010/0117456 A1 | 5/2010 | Karalis et al. | |
| 2010/0123353 A1 | 5/2010 | Joannopoulos et al. | |
| 2010/0123354 A1 | 5/2010 | Joannopoulos et al. | |
| 2010/0123355 A1 | 5/2010 | Joannopoulos et al. | |
| 2010/0127573 A1 | 5/2010 | Joannopoulos et al. | |
| 2010/0127574 A1 | 5/2010 | Joannopoulos et al. | |
| 2010/0127575 A1 | 5/2010 | Joannopoulos et al. | |
| 2010/0133918 A1 | 6/2010 | Joannopoulos et al. | |
| 2010/0133919 A1 | 6/2010 | Joannopoulos et al. | |
| 2010/0133920 A1 | 6/2010 | Joannopoulos et al. | |
| 2010/0171370 A1 | 7/2010 | Karalis et al. | |
| 2010/0181844 A1 | 7/2010 | Karalis et al. | |
| 2010/0187911 A1 | 7/2010 | Joannopoulos et al. | |
| 2010/0201205 A1 | 8/2010 | Karalis et al. | |
| 2010/0207458 A1 | 8/2010 | Joannopoulos et al. | |
| 2010/0225175 A1 | 9/2010 | Karalis et al. | |
| 2010/0231053 A1 | 9/2010 | Karalis et al. | |
| 2010/0237706 A1 | 9/2010 | Karalis et al. | |
| 2010/0237707 A1 | 9/2010 | Karalis et al. | |
| 2010/0237708 A1 | 9/2010 | Karalis et al. | |
| 2010/0253152 A1 | 10/2010 | Karalis et al. | |
| 2010/0264745 A1 | 10/2010 | Karalis et al. | |
| 2011/0084658 A1* | 4/2011 | Yamamoto | B60L 5/005 320/108 |
| 2012/0089286 A1* | 4/2012 | Nakata | B60L 11/005 701/22 |
| 2012/0153894 A1* | 6/2012 | Widmer | H04B 5/0037 320/108 |
| 2012/0179320 A1* | 7/2012 | Abe | B60K 6/26 701/22 |
| 2012/0212071 A1* | 8/2012 | Miyabayashi | H04B 5/0037 307/104 |
| 2012/0259496 A1* | 10/2012 | Ikegami | B60K 6/365 701/22 |
| 2012/0277059 A1* | 11/2012 | Akutsu | B60K 6/387 477/5 |
| 2012/0323423 A1 | 12/2012 | Nakamura et al. | |
| 2013/0073133 A1* | 3/2013 | Muta | F02D 29/02 701/22 |
| 2013/0110365 A1* | 5/2013 | Kimura | F16H 61/12 701/65 |
| 2013/0116078 A1* | 5/2013 | Hokoi | B60K 6/445 475/5 |
| 2013/0127409 A1 | 5/2013 | Ichikawa | |
| 2013/0192417 A1* | 8/2013 | Fujita | B60K 6/26 74/661 |
| 2013/0193749 A1 | 8/2013 | Nakamura et al. | |
| 2013/0226380 A1* | 8/2013 | Ando | B60W 20/108 701/22 |
| 2013/0335015 A1* | 12/2013 | Ichikawa | H02J 7/025 320/108 |
| 2014/0032050 A1* | 1/2014 | Kim | B62D 5/0463 701/42 |
| 2014/0332294 A1* | 11/2014 | Soma' | B60K 6/26 180/65.245 |
| 2015/0134160 A1* | 5/2015 | Liang | B60W 10/06 701/22 |
| 2015/0246614 A1* | 9/2015 | Dames | B60L 5/005 191/10 |
| 2015/0246620 A1* | 9/2015 | Fukushima | H02J 50/80 307/10.1 |
| 2015/0252735 A1* | 9/2015 | Orita | F02N 11/0814 123/179.4 |
| 2015/0286880 A1* | 10/2015 | Itou | B60L 11/1829 348/148 |
| 2015/0291018 A1* | 10/2015 | Abe | B60K 17/04 180/65.25 |

FOREIGN PATENT DOCUMENTS

| | | |
|---|---|---|
| AU | 2010200044 A1 | 1/2010 |
| AU | 2006269374 C1 | 3/2010 |
| CA | 2 615 123 A1 | 1/2007 |
| CA | 2 682 284 A1 | 10/2008 |
| CN | 101258658 A | 9/2008 |
| CN | 101682216 A | 3/2010 |
| CN | 101860089 A | 10/2010 |
| EP | 1 902 505 A2 | 3/2008 |
| EP | 2 130 287 A1 | 12/2009 |
| IN | 735/DELNP/2008 | 5/2008 |
| IN | 6195/DELNP/2009 | 7/2010 |
| JP | 4165480 B2 | 10/2008 |
| JP | 2009-501510 A | 1/2009 |
| JP | 2009280147 A * | 12/2009 |
| JP | 2010274702 A * | 12/2010 |
| JP | 2012-080770 A | 4/2012 |
| JP | 2013-110822 A | 6/2013 |
| JP | 2013-126327 A | 6/2013 |
| JP | 2013-146148 A | 7/2013 |
| JP | 2013-146154 A | 7/2013 |
| JP | 2013-154815 A | 8/2013 |
| JP | 2013-169132 A | 8/2013 |
| KR | 2008-0031398 A | 4/2008 |
| KR | 2010-0015954 A | 2/2010 |

(56) References Cited

FOREIGN PATENT DOCUMENTS

| | | |
|---|---|---|
| WO | 2007/008646 A2 | 1/2007 |
| WO | 2008/118178 A1 | 10/2008 |
| WO | 2013/108108 A2 | 7/2013 |

\* cited by examiner

<NON-MESHING STATE>

<MESHING STATE>

VEHICLE INCLUDING ELECTRIC POWER TRANSMISSION AND RECEPTION UNIT

TECHNICAL FIELD

The present invention relates to a vehicle including an electric power transmission and reception unit.

BACKGROUND ART

As disclosed in PTL 1 to PTL 7, an electric power reception apparatus and an electric power transmission apparatus wirelessly receiving and transmitting electric power have been known. It is necessary for such a wireless electric power transmission and reception system to transfer electric power in the condition where an electric power transmission coil and an electric power reception coil are positionally aligned with each other.

For example, in Japanese Patent Laying-Open No. 2012-080770 (PTL 7) disclosing a wireless charging system, a system guiding a vehicle to an electric power transmission apparatus based on a reception voltage is proposed.

CITATION LIST

Patent Literature

[PTL 1] Japanese Patent Laying-Open No. 2013-169132
[PTL 2] Japanese Patent Laying-Open No. 2013-154815
[PTL 3] Japanese Patent Laying-Open No. 2013-146154
[PTL 4] Japanese Patent Laying-Open No. 2013-146148
[PTL 5] Japanese Patent Laying-Open No. 2013-110822
[PTL 6] Japanese Patent Laying-Open No. 2013-126327
[PTL 7] Japanese Patent Laying-Open No. 2012-080770
[PTL 8] Japanese Patent No. 4165480

SUMMARY OF INVENTION

Technical Problem

In general, when positional alignment between a vehicle and an electric power transmission apparatus is completed, a driver sets the shift range to a parking range (P range) in the condition where an electric power reception apparatus and the electric power transmission apparatus are opposite to each other. When the shift range is set to the P range, a groove of a parking gear and a protrusion of a parking pole are caused to fit each other. Accordingly, the vehicle is prevented from moving.

Depending on the angle at which the parking gear is stopped, however, the top land of a tooth of the parking gear and the protrusion of the parking pole may abut against each other, namely the protrusion may not successfully fit in a groove of the parking gear. In this case, an external force (such as wind force or force of gravity exerted when the vehicle is stopped on a downhill) may cause the vehicle to move. The movement of the vehicle causes the parking gear to rotate and accordingly causes the protrusion of the parking pole to fit in a groove of the parking gear. The rotational direction of the parking gear in this case, namely the direction of movement of the vehicle varies depending on the situation in which the vehicle is placed. No control has been done to address this.

Consequently, the vehicle may be caused to move in the fore-and-aft direction when the shift range is set to the P range in the condition where the electric power reception apparatus and the electric power transmission apparatus are opposite to each other. At this time, if the electric power reception apparatus was originally aligned so that the apparatus is located at a position where it can receive electric power but has its center slightly displaced, movement of the vehicle after the positional alignment may result in movement of the electric power reception apparatus out of the region where it can receive electric power.

An object of the present invention is to provide a vehicle capable of suppressing movement of the power reception apparatus out of a region where it can receive electric power, when the shift range is set to the parking range and the top land of a tooth of the parking gear and the protrusion of the parking pole abut against each other.

Solution to Problem

In summary, the present invention is a vehicle including an electric power reception unit wirelessly receiving electric power from an electric power transmission apparatus, a motive power generation apparatus generating on an output shaft a drive force for moving the vehicle, and a control apparatus controlling the motive power generation apparatus. The motive power generation apparatus includes a parking gear provided on the output shaft, a parking pole having a protrusion to be fit in a groove of the parking gear, and a drive unit outputting the drive force. The control apparatus controls the drive unit so that in a case where the electric power reception unit is located within an area in which electric power can be received from the electric power transmission apparatus and where a predetermined condition is met including a condition that the motive power generation apparatus has been set to a parking range, the vehicle is moved in a direction that causes the electric power reception unit to approach the electric power transmission apparatus.

Control can be performed in the above-described manner to avoid, even when the vehicle is stopped in the condition where the top land of a tooth of the parking gear and the protrusion of the parking pole abut against each other and thus do not well mesh each other, displacement of the vehicle to a position which is disadvantageous for the vehicle to receive electric power, due to an external force later applied to the vehicle.

Preferably, in a case where the output shaft is not rotated in spite of the fact that the predetermined condition is met and the drive unit is caused to output a predetermined drive force, the control apparatus stops the drive unit from outputting the drive force.

The drive force (drive torque) of the drive unit results in a large energy loss if the drive torque continues being output for a long time. In view of this, if the output shaft is not rotated in spite of the fact that the drive torque of a predetermined magnitude is output, the drive unit is stopped from outputting the drive torque. Accordingly, in the case for example where a wheel abuts on a car stop, or where the protrusion of the parking pole successfully fits in a valley (groove) between a tooth and a tooth of the parking gear, a subsequent energy loss can be reduced.

Preferably, the vehicle further includes an informing apparatus informing a driver of the fact that the drive unit is to output a drive force when the predetermined condition is met and the drive unit is to caused to output the drive force.

In this way, a driver's feeling of strangeness caused by a tremor of the vehicle can be lessened even if the tremor is a slight tremor.

Preferably, a rotational amount by which the output shaft is rotated by a drive force which is caused to be output from the drive unit by the control apparatus in response to satisfaction of the predetermined condition is equal to or less than a rotational amount corresponding to a width of one tooth of the parking gear.

The rotational amount can thus be restricted to accordingly restrict a movement amount by which the vehicle is moved and thereby prevent the vehicle from moving more than necessary.

Preferably, the vehicle further includes a detector detecting a rotational angle of the parking pole. The control apparatus detects, based on the rotational angle, that a top land of a tooth of the parking gear and the protrusion of the parking pole abut against each other.

This detection can be done to dispense with an unnecessary process of meshing and accordingly extend the life of the parts.

Preferably, the control apparatus holds history information indicating whether or not there has been performed a process of causing the drive unit to output a drive force and thereby move the vehicle in a direction of causing the electric power reception unit to approach the electric power transmission apparatus, in response to satisfaction of the predetermined condition. The predetermined condition includes a condition that the history information indicates that the process has not been performed.

ADVANTAGEOUS EFFECTS OF INVENTION

In accordance with the present invention, a vehicle can be implemented that is capable of efficiently stabilizing electric power reception even when the top land of a tooth of the parking gear and the protrusion of the parking pole abut against each other at the start of electric power reception.

DESCRIPTION OF EMBODIMENTS

Figure 1:
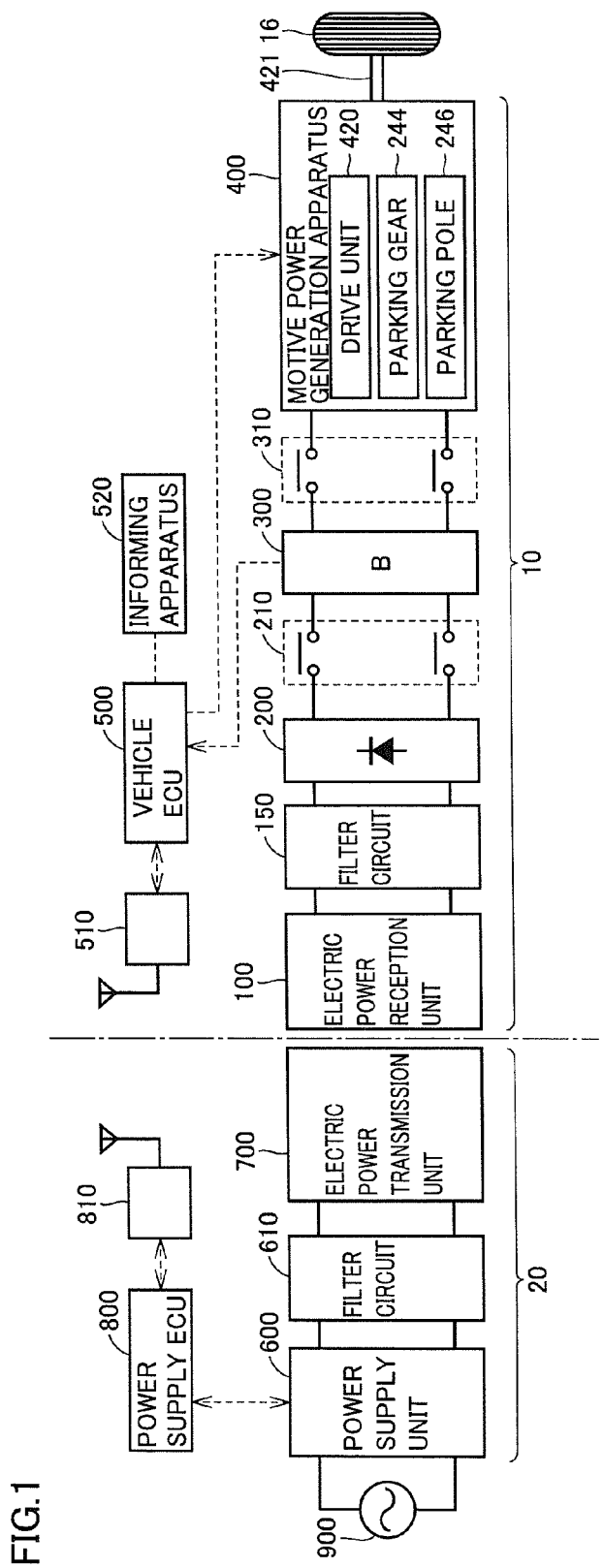
FIG. 1 is an overall configuration diagram of an electric power transfer system as an example of embodiments of the present invention.

In the following, embodiments of the present invention will be described in detail with reference to the drawings. In the drawings, the same or corresponding parts are denoted by the same reference characters, and a description thereof will not be repeated.

FIG. 1 is an overall configuration diagram of an electric power transfer system as an example of embodiments of the present invention.

Referring to FIG. 1, a vehicle 10 includes an electric power reception unit 100 wirelessly receiving electric power from an electric power transmission apparatus 20, a motive power generation apparatus 400 generating on an output shaft a drive force for moving vehicle 10, and a vehicle ECU (Electronic Control Unit) 500 which is a control apparatus controlling motive power generation apparatus 400. Motive power generation apparatus 400 includes a parking gear 244 provided on output shaft 421, a parking pole 246 having a protrusion to be fit in a groove of parking gear 244, and a drive unit 420 which outputs the drive force. Vehicle ECU 500 controls drive unit 420 so that in a case where electric power reception unit 100 is located within an area in which electric power can be received from electric power transmission apparatus 20 and where a predetermined condition is met including a condition that motive power generation apparatus 400 has been set to the parking range, the vehicle is moved in a direction that causes electric power reception unit 100 to approach electric power transmission apparatus 20.

Figure 5:
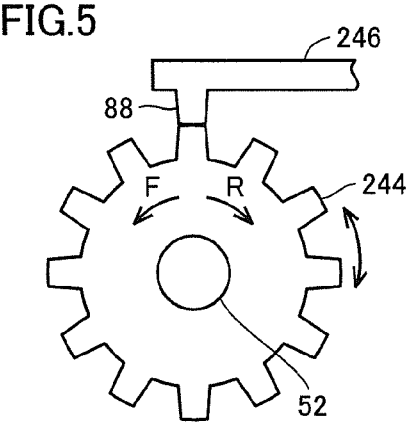
FIG. 5 is a diagram for illustrating a principle of movement of a parking mechanism (non-meshing state).

Control can be performed in the above-described manner to avoid, even when vehicle 10 is stopped in the condition where the top land of a tooth of parking gear 244 and the protrusion of parking pole 246 abut against each other and thus do not well mesh each other as shown in FIG. 5, displacement of vehicle 10 to a position which is disadvantageous for vehicle 10 to receive electric power (displacement in the direction indicated by NG in FIG. 7), due to an external force later applied to the vehicle.

Preferably, in a case where output shaft 421 is not rotated in spite of the fact that the predetermined condition is met and drive unit 420 is caused to output a predetermined drive force (drive torque), vehicle ECU 500 stops drive unit 420 from outputting the drive torque.

Figure 6:
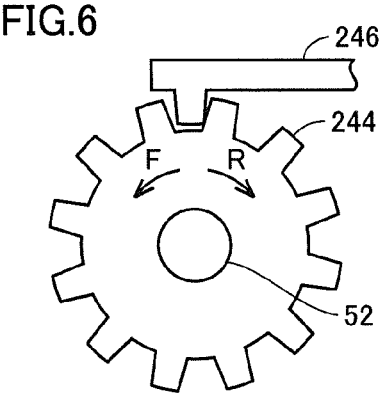
FIG. 6 is a diagram for illustrating the principle of movement of the parking mechanism (meshing state).

The drive torque of drive unit 420 results in a large energy loss if the drive torque continues being output for a long time. In view of this, if output shaft 421 is not rotated in spite of the fact that the drive torque of a predetermined magnitude is output, the drive unit is stopped from outputting the drive torque. Accordingly, in the case for example where the parking brake is adequately applied, where wheel 16 abuts on a car stop, or where the protrusion of parking pole 246 successfully fits in a valley between a tooth and a tooth of parking gear 244 as shown in FIG. 6, a subsequent energy loss can be reduced.

Preferably, vehicle 10 further includes an informing apparatus 520 informing a driver of the fact that the predetermined condition is met and drive unit 420 is to be caused to output a drive force.

In this way, a driver's feeling of strangeness caused by a tremor of vehicle 10 can be lessened even if the tremor is a slight tremor.

Preferably, a rotational amount by which output shaft 421 is rotated by a drive torque which is caused to be output from drive unit 420 by vehicle ECU 500 in response to satisfaction of the predetermined condition is equal to or less than a rotational amount corresponding to a width of one tooth of parking gear 244. The rotational amount can thus be restricted to accordingly restrict a movement amount by which the vehicle is moved and thereby prevent the vehicle from moving more than necessary.

In the following, details of a specific configuration of vehicle 10 and electric power transmission apparatus 20 will further be described. The electric power transfer system according to the embodiment includes vehicle 10 and electric power transmission apparatus 20. Vehicle 10 further includes a filter circuit 150, a rectification unit 200, a power storage device 300, and motive power generation apparatus 400.

Figure 2:
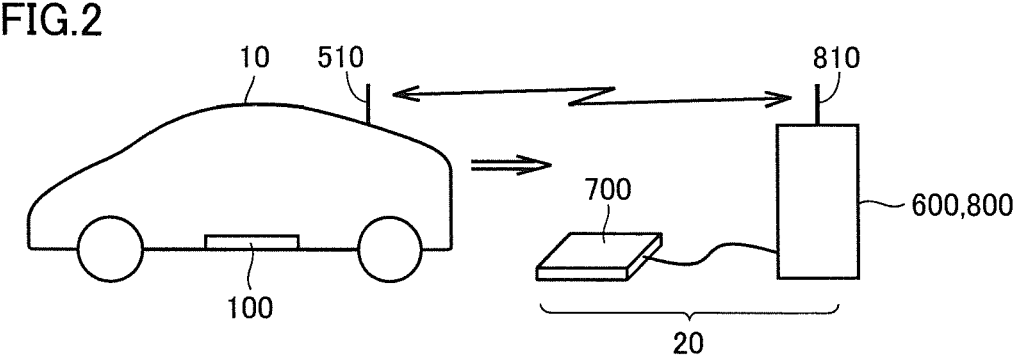
FIG. 2 is a diagram for illustrating how a vehicle is moved to positionally align an electric power reception unit and an electric power transmission unit with each other.

Electric power reception unit 100 includes a coil for wirelessly receiving electric power (AC) which is output from an electric power transmission unit 700 of electric power transmission apparatus 20. Electric power reception unit 100 outputs the received electric power to rectification unit 200. For example, as shown in FIG. 2, electric power transmission unit 700 of electric power transmission apparatus 20 is provided on or in the ground, and electric power reception unit 100 is disposed in a lower part of the vehicle body.

The place where electric power reception unit 100 is disposed is not limited to this. For example, if electric power transmission apparatus 20 is provided above the vehicle, electric power reception unit 100 may be disposed in an upper part of the vehicle body.

Rectification unit 200 rectifies the AC power received by electric power reception unit 100 and outputs it to power storage device 300. Filter circuit 150 is provided between electric power reception unit 100 and rectification unit 200 and suppresses harmonic noise which is generated when the electric power is received from electric power transmission apparatus 20. Filter circuit 150 is formed for example of an LC filter including an inductor and a capacitor. However, the configuration without filter circuit 150 can also be used.

Power storage device 300 is a rechargeable DC power supply and formed for example of a secondary battery such as lithium-ion battery or nickel-metal hydride battery. The voltage of power storage device 300 is about 200 V for example. Power storage device 300 stores electric power which is output from rectification unit 200 and also stores electric power generated by motive power generation apparatus 400. Power storage device 300 supplies the stored electric power to motive power generation apparatus 400. As power storage device 300, a capacitor of a large capacitance may also be employed. Although not shown particularly, a DC/DC converter adjusting the output voltage of rectification unit 200 may be provided between rectification unit 200 and power storage device 300.

Motive power generation apparatus 400 uses the electric power stored in power storage device 300 to generate a drive force for causing vehicle 10 to travel. Although not shown particularly, motive power generation apparatus 400 includes, for example, an inverter receiving electric power from power storage device 300, a motor driven by the inverter, drive wheels driven by the motor, and the like. Motive power generation apparatus 400 may also include an electric generator for charging power storage device 300 and an engine capable of driving the electric generator.

Vehicle ECU 500 includes a CPU (Central Processing Unit), a memory, an input/output buffer, and the like (none of them is shown), receives signals from a variety of sensors, outputs a control signal to each device, and controls each device in vehicle 10. By way of example, vehicle ECU 500 performs control of travel of vehicle 10 and control of charging of power storage device 300. These control operations are not limited to processing by software, and may be processing by dedicated hardware (electronic circuit).

Between rectification unit 200 and power storage device 300, a relay 210 is provided. Relay 210 is rendered ON by vehicle ECU 500 when power storage device 300 is charged by electric power transmission apparatus 20. Between power storage device 300 and motive power generation apparatus 400, a system main relay (SMR) 310 is also provided. When a request to activate motive power generation apparatus 400 is made, SMR 310 is rendered ON by vehicle ECU 500.

When power storage device 300 is charged by electric power transmission apparatus 20, vehicle ECU 500 communicates with electric power transmission apparatus 20 through a communication apparatus 510 to communicate information about the start/stop of charging, the state of electric power reception by vehicle 10 and the like, to/from electric power transmission apparatus 20.

FIG. 2 is a diagram for illustrating how a vehicle is moved to positionally align the electric power reception unit and the electric power transmission unit with each other. Referring to FIG. 2, by means of a camera (not shown) mounted on the vehicle or based on the strength of electric power received from electric power transmission unit 700 in a power transmission test, for example, the vehicle or the electric power transmission apparatus determines whether or not electric power reception unit 100 is positionally aligned with electric power transmission unit 700, and informing apparatus 520 informs the user of the result. As shown in FIG. 2, based on the information received from informing apparatus 520, the user moves vehicle 10 so that the positional relationship between electric power reception unit 100 and electric power transmission unit 700 is a positional relationship appropriate for transmission and reception of electric power. At this time, the user may not necessarily operate the steering wheel or accelerator pedal, and vehicle 10 may automatically move to be positionally aligned, which may be monitored by the user through informing apparatus 520.

Referring again to FIG. 1, electric power transmission apparatus 20 includes a power supply unit 600, a filter circuit 610, electric power transmission unit 700, and a power supply ECU 800. Power supply unit 600 receives electric power from an external power supply 900 such as commercial system power supply to generate AC power having a predetermined transmission frequency.

Electric power transmission unit 700 includes a coil for wirelessly transmitting electric power to electric power reception unit 100 of vehicle 10. Electric power transmission unit 700 receives from power supply unit 600 AC power having the transmission frequency and wirelessly transmits the electric power to electric power reception unit 100 of vehicle 10 through an electromagnetic field generated around electric power transmission unit 700.

Filter circuit 610 is disposed between power supply unit 600 and electric power transmission unit 700 and suppresses harmonic noise which is generated from power supply unit 600. Filter circuit 610 is formed of an LC filter including an inductor and a capacitor. However, the configuration without filter circuit 610 can also be used.

Power supply ECU 800 includes a CPU, a memory, an input/output buffer, and the like (none of them is shown), receives signals from a variety of sensors, outputs a control signal to each device, and controls each device in electric power transmission apparatus 20. By way of example, power supply ECU 800 controls switching of power supply unit 600 so that AC power having the transmission frequency is generated by power supply unit 600. These control operations are not limited to processing by software, and may be processing by dedicated hardware (electronic circuit).

When electric power is transmitted to vehicle 10, power supply ECU 800 communicates with vehicle 10 through a communication apparatus 810 to communicate information about the start/stop of charging, the state of electric power reception by vehicle 10 and the like, to/from vehicle 10.

In electric power transmission apparatus 20, AC power having a predetermined transmission frequency is supplied from power supply unit 600 to electric power transmission unit 700 through filter circuit 610. Electric power transmission unit 700 and electric power reception unit 100 of vehicle 10 each include a coil and a capacitor and designed to resonate at the transmission frequency. Preferably, a Q factor which represents the strength of resonance between electric power transmission unit 700 and electric power reception unit 100 is equal to or larger than 100.

As the AC power is supplied from power supply unit 600 to power transmission unit 700 through filter circuit 610, the energy (electric power) is transferred from electric power transmission unit 700 to electric power reception unit 100 through an electro-magnetic field generated between the coil of electric power transmission unit 700 and the coil of electric power reception unit 100. The energy (electric power) transferred to electric power reception unit 100 is supplied to power storage device 300 through filter circuit 150 and rectification unit 200.

Although not shown particularly, an isolation transformer may be provided between electric power transmission unit 700 and power supply unit 600 (between electric power transmission unit 700 and filter circuit 610 for example) in electric power transmission apparatus 20. In vehicle 10 as well, an isolation transformer may be provided between electric power reception unit 100 and rectification unit 200 (between electric power reception unit 100 and filter circuit 150 for example).

Figure 3:
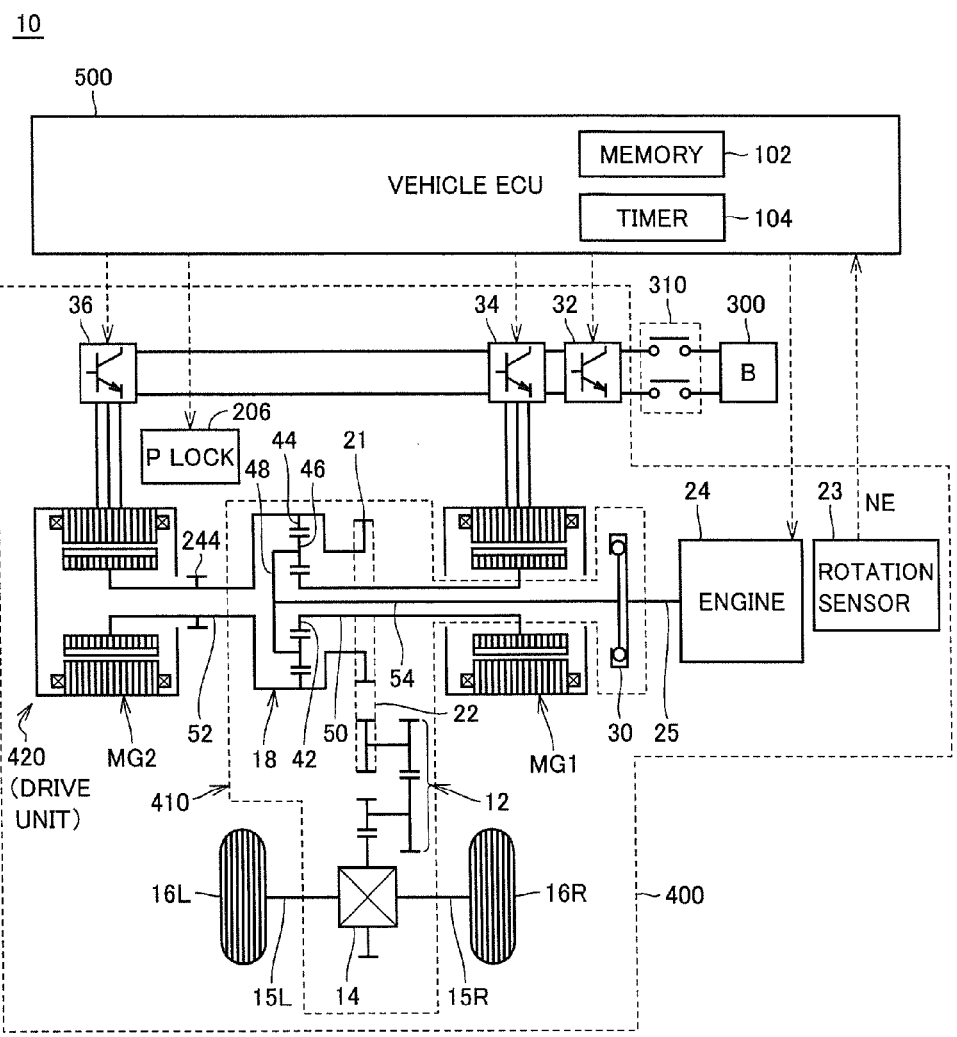
FIG. 3 is a diagram showing an example of a detailed configuration of a motive power generation apparatus 400 of a vehicle 10.

FIG. 3 is a diagram showing an example of a detailed configuration of motive power generation apparatus 400 of vehicle 10.

Referring to FIG. 3, vehicle 10 includes power storage device 300, system main relay 310, motive power generation apparatus 400, and vehicle ECU 500 controlling it. Motive power generation apparatus 400 includes an engine 24, a motor MG2, a generator MG1, a motive power transmission mechanism 410, drive wheels 16R, 16L, driveshafts 15R, 15L, a voltage boost converter 32, and inverters 34, 36.

Motive power transmission mechanism 410 includes a motive power transmission gear 12, a differential gear 14, a planetary gear 18, a motive power retrieval gear 21, a chain belt 22, and a damper 30.

A crankshaft 25 of engine 24 is connected through damper 30 to planetary gear 18 and generator MG1. Damper 30 reduces the amplitude of torsional vibration of crankshaft 25.

Motive power retrieval gear 21 is connected by chain belt 22 to motive power transmission gear 12. Motive power retrieval gear 21 is coupled to a ring gear 44 of planetary gear 18, and transmits motive power received from ring gear 44 to motive power transmission gear 12 through chain belt 22. Motive power transmission gear 12 transmits motive power to drive wheels 16R, 16L through differential gear 14.

Planetary gear 18 is configured to include: a sun gear 42 coupled to a hollow sun gear shaft 50 having an axial center through which a carrier shaft 54 which is coaxial with crankshaft 25 extends; ring gear 44 coupled to a ring gear shaft 52 placed coaxially with a carrier shaft 54; a plurality of planetary pinion gears 46 disposed between sun gear 42 and ring gear 44 and revolving around the outer circumference of sun gear 42 while rotating on its axis; and a planetary carrier 48 coupled to an end of carrier shaft 54 and supporting the rotational shaft of each planetary pinion gear 46.

In this planetary gear 18, the three shafts, namely sun gear shaft 50, ring gear shaft 52, and carrier shaft 54 coupled respectively to sun gear 42, ring gear 44, and planetary carrier 48 are configured to serve as input/output shafts of the motive power. When the motive power which is input/output to/from any two of these three shafts is determined, the motive power which is input/output to/from the remaining one shaft is determined based on the determined motive power which is input/output to/from the two shafts.

Generator MG1 and motor MG2 are each a three-phase AC synchronous motor generator, and each include a rotor having a plurality of permanent magnets on its outer circumferential surface, and a stator on which wound a three phase coil generating a rotating magnetic field. The rotor of generator MG1 is coupled to sun gear shaft 50 and the rotor of motor MG2 is coupled to ring gear shaft 52. Generator MG1 and motor MG2 each operate as an electric motor rotationally driving the rotor through interaction between a magnetic field generated by the permanent magnets and a magnetic field generated by the three-phase coil, and also operate as an electric generator causing an electromotive force to be generated on the opposite ends of the three-phase coil through interaction between a magnetic field generated by the permanent magnets and rotation of the rotor.

A gear mechanism increasing or decreasing the number of revolutions of motor MG2 may be provided between ring gear shaft 52 and the rotor of motor MG2.

Power storage device 300 supplies a generated DC voltage to voltage boost converter 32 and is also charged with a DC voltage from voltage boost converter 32.

Voltage boost converter 32 receives a DC voltage from power storage device 300, boosts the received DC voltage, and outputs it to inverters 34, 36. Voltage boost converter 32 also reduces a DC voltage from inverters 34, 36 to charge power storage device 300 therewith.

Inverters 34, 36 receive a DC voltage from voltage boost converter 32, converts the received DC voltage into an AC voltage, and outputs it to generator MG1 and motor MG2, respectively. Inverters 34, 36 also convert an AC voltage generated by generator MG1 and motor MG2 into a DC voltage, and output the resultant DC voltage to voltage boost converter 32.

Based on a torque command value and a rotational speed of generator MG1 and motor MG2 as well as an input/output voltage of voltage boost converter 32, vehicle ECU 500 generates a control signal for turning on/off each power transistor in voltage boost converter 32, and outputs the generated control signal to voltage boost converter 32.

Based on a torque command value and electric current of generator MG1 and motor MG2 as well as an input voltage of inverters 34, 36, vehicle ECU 500 also generates a control signal for turning on/off each power transistor in inverters 34, 36, and outputs the generated control signal to inverters 34, 36.

Rotational speed NE of engine 24 is detected by a rotation sensor 23 and transmitted to vehicle ECU 500. Specifically, as rotation sensor 23, a crank position sensor disposed on the crankshaft or the like is used.

Figure 4:
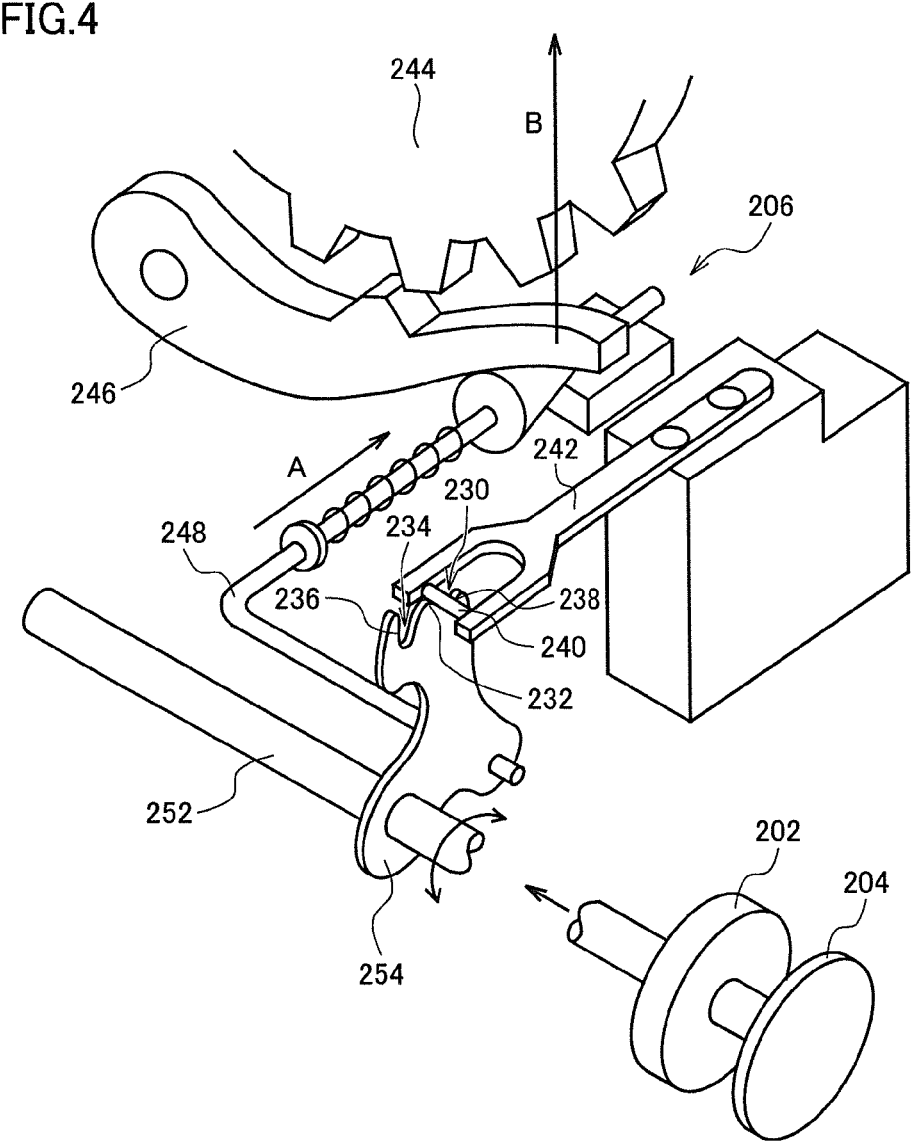
FIG. 4 is a diagram showing a detailed structure of a parking lock mechanism 206 shown in FIG. 3.

FIG. 4 is a diagram showing a detailed structure of a parking lock mechanism 206 shown in FIG. 3.

Referring to FIGS. 3 and 4, vehicle ECU 500 uses an actuator 202 and an encoder 204 to switch the state of parking lock mechanism 206.

A P command signal representing an instruction from a driver received by an input unit such as shift lever or parking switch (not shown) is transmitted to vehicle ECU 500. The P command signal indicates a shift position.

Vehicle ECU 500 drives the actuator so that the shift range of the motive power generation apparatus matches the shift position indicated by the P command signal. For example, in order to switch the shift range between the P range and the non-P range, vehicle ECU 500 controls the operation of actuator 202 which drives parking lock mechanism 206, and shows on an indicator (not shown) the current state of the shift range. When a driver operates the input unit while the shift range is the non-P range, vehicle ECU 500 switches the shift range to the P range and shows on the indicator the fact that the current shift range is the P range.

Actuator 202 is formed for example of a switched reluctance motor (hereinafter expressed as "SR motor"), and receives an actuator control signal from vehicle ECU 500 to drive parking lock mechanism 206. Encoder 204 rotates together with actuator 202 and detects the state of rotation of the SR motor. As encoder 204 in the present embodiment, a rotary encoder which outputs A-phase and B-phase signals may be used, for example. Vehicle ECU 500 receives a signal which is output from encoder 204 to identify the state of rotation of the SR motor, and controls energization for driving the SR motor.

Parking lock mechanism 206 includes: a shaft 252 rotated by actuator 202; a detent plate 254 caused to rotate by rotation of shaft 252; a rod 248 operated by rotation of detent plate 254; parking gear 244 fixed on ring gear shaft 52; parking pole 246 for locking parking gear 244; a detent spring 242 restricting rotation of detent plate 254 for fixing the shift position; and a roller 240. Detent plate 254 is driven by actuator 202 to switch the shift position. Encoder 204 also obtains a count value which depends on the rotational amount of actuator 202.

FIG. 4 shows a state where the shift range is the non-P range. In this state, parking pole 246 does not lock parking gear 244. Therefore, rotation of the driveshaft of the vehicle is not hindered. As actuator 202 causes shaft 252 to rotate clockwise in this state, rod 248 is pushed in the direction of an arrow A shown in FIG. 4 through detent plate 254. Accordingly, a tapered portion provided on a tip of rod 248 pushes parking pole 246 upward in the direction of an arrow B shown in FIG. 4.

The rotation of detent plate 254 causes roller 240 of detent spring 242 which is originally located at one of the two valleys on the top of detent plate 254, namely at a non-P position 230, to creep over a peek 232 into the other valley, namely a P range position 234. Roller 240 is provided on detent spring 242 so that roller 240 is rotatable about its axis. When detent plate 254 has rotated to cause roller 240 to be located at P range position 234, parking pole 246 has been pushed up to the position where the protrusion of parking pole 246 fits in the portion between teeth of parking gear 244. Accordingly, the driveshaft of the vehicle is mechanically fixed and the shift range is switched to the P range.

FIG. 5 is a diagram for illustrating a principle of movement of a parking mechanism (non-meshing state).

FIG. 6 is a diagram for illustrating the principle of movement of the parking mechanism (meshing state).

The parking lock mechanism is made up of parking gear 244 and parking pole 246. Depending on the state when the vehicle is stopped (the angle at which the parking gear is stopped), parking pole 246 may not mesh with parking gear 244 as shown in FIG. 5. In such a case, if an external force such as force of gravity exerted on the vehicle on a slope or vibration is applied while the parking brake is not adequately applied, the vehicle is caused to move forward (the direction of an arrow F) or rearward (the direction of an arrow R) within a certain range until parking pole 246 meshes with parking gear 244.

Figure 7:
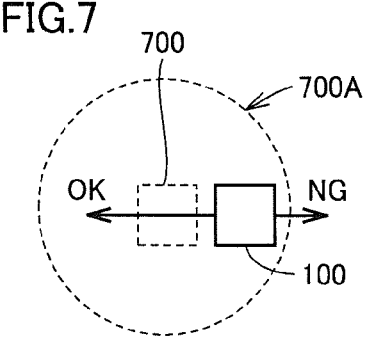
FIG. 7 is a diagram for illustrating a range in which a vehicle is moved.

FIG. 7 is a diagram for illustrating a range in which a vehicle is moved. FIG. 7 shows a range 700A in which electric power reception unit 100 can receive electric power from electric power transmission unit 700 placed on a road. When electric power reception unit 100 of the vehicle is at the position shown in FIG. 7, it can receive electric power. If, however, the parking pole does not mesh with the parking gear as shown in FIG. 5, the output shaft (ring gear shaft 52) may be rotated in the F direction or the R direction, possibly resulting in the state shown in FIG. 6. At this time, even a maximum amount by which the vehicle is moved is equal to or less than the amount of movement corresponding to the pitch between a tooth and a tooth of parking gear 244. Although this amount of movement is very small, there is a possibility that if electric power reception unit 100 is originally located within range 700A where it can receive electric power as shown in FIG. 7 but the location of electric power reception unit 100 is near the border of range 700A, movement of electric power reception unit 100 in the NG direction causes electric power reception unit 100 to be unable to receive electric power. In view of this, the present embodiment moves the vehicle in the OK direction in FIG. 7 to cause the parking pole to mesh with the parking gear.

In this way, the inconvenience that the vehicle with its positional alignment completed by a user is moved to become unable to receive electric power can be prevented.

Figure 8:
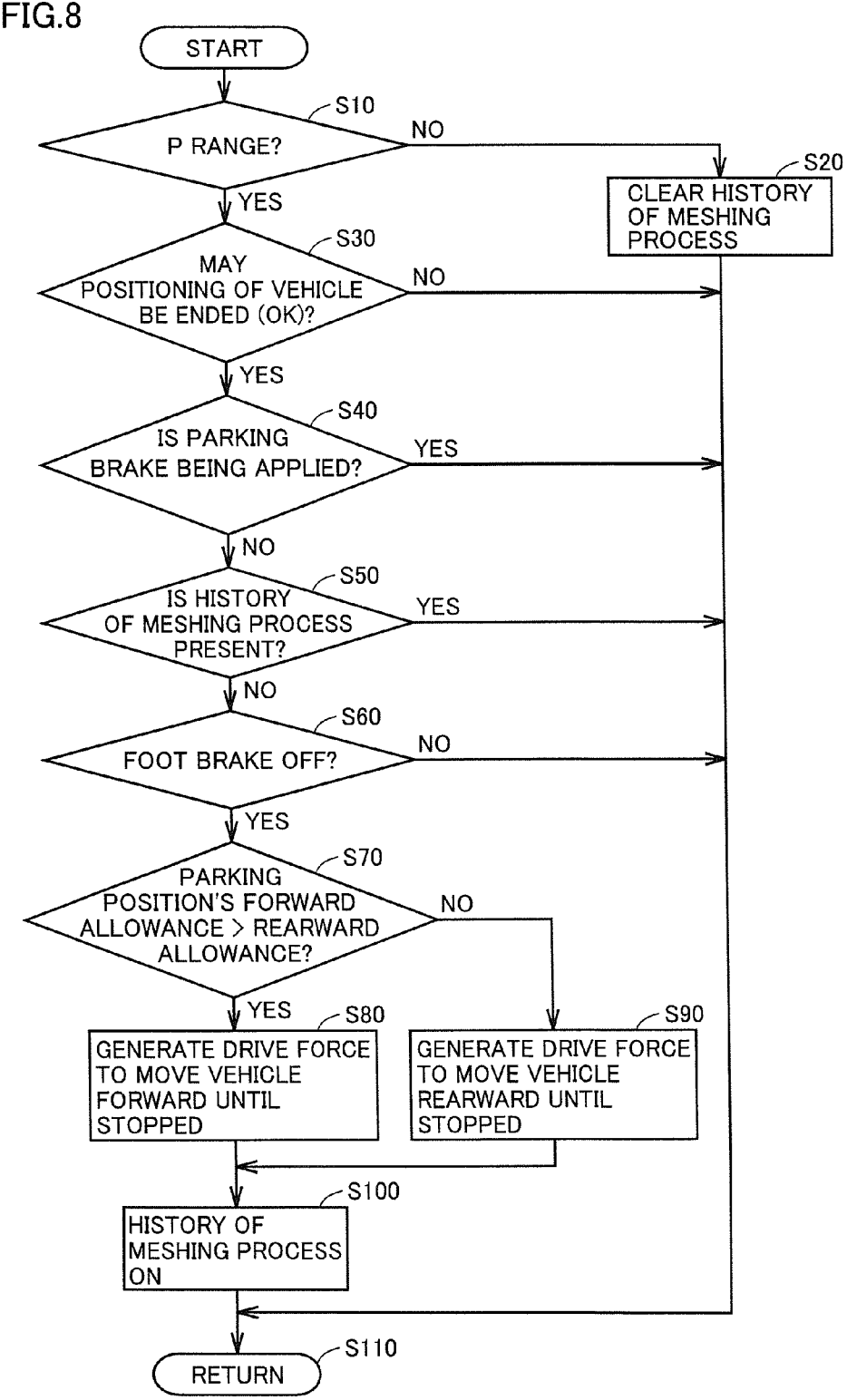
FIG. 8 is a flowchart for illustrating a process of meshing executed by a vehicle ECU 500.

FIG. 8 is a flowchart for illustrating a process of meshing executed by vehicle ECU 500. A procedure shown in the flowchart is executed by being called from a main routine every certain time period or each time a predetermined condition is met.

Referring to FIG. 8, first in step S10, vehicle ECU 500 determines whether or not the shift range which is set for motive power generation apparatus 400 is the P (parking) range. For example, based on an output of a shift position sensor of the shift lever or an output of encoder 204 in FIG. 4, vehicle ECU 500 can determine whether or not the shift range is the P range.

When it is determined in step S10 that the shift range is not the P range, the procedure proceeds to step S20 in which the history of the process of meshing is cleared and then the procedure proceeds to step S110 so that the control returns to the main routine. The history of the process of meshing will be described later in connection with step S50.

When it is determined in step S10 that the shift range is the P range, the procedure proceeds to step S30. In step S30, vehicle ECU 500 confirms whether or not positioning has been completed. In the case where a driver has parked the vehicle at a predetermined position in accordance with guidance of a guide system of the vehicle and thereafter operates a switch to indicate that positioning has been completed, it is determined that the process of positioning the vehicle may be ended (OK). Alternatively, in the case where the vehicle has been kept stopped for a predetermined time, it may be determined as well that the process of positioning the vehicle may be ended (OK).

When it is not determined in step S30 that the process of positioning may be ended, the procedure proceeds to step S110 so that the control returns to the main routine. In contrast, when it is determined in step S30 that the process of positioning may be ended, the procedure proceeds to step S40.

In step S40, it is determined whether or not the parking brake, if applied, is applied to a sufficient extent. When it is determined in step S40 that the parking brake is applied to a sufficient extent, there is no possibility of movement of the vehicle due to an external force and therefore the meshing process may not be performed even in the state as shown in FIG. 5. Thus, when the parking brake is applied to a sufficient extent, the procedure proceeds to step S110 so that the control returns to the main routine.

In contrast, when it is determined in step S40 that the parking brake is not applied or the parking brake is not applied to a sufficient extent, the procedure proceeds to step S50.

The determination in step S40 may be made simply based on whether or not a parking brake lamp has been lit, or made based on an output of a sensor which is provided for detecting the extent to which the brake is applied. Further, it may be possible to skip the process in step S40.

In step S50, it is determined whether a history of the process of meshing is present or not. Vehicle ECU 500 holds information about a history which indicates whether or not a process has been executed to cause the drive unit (MG2 or engine) to output a drive torque and thereby move vehicle 10 in a direction that causes electric power reception unit 100 to approach electric power transmission apparatus 20. Because step S50 is performed, a predetermined condition on which the process of meshing is executed includes, in addition to the condition that electric power reception unit 100 is located within an area in which electric power can be received from electric power transmission apparatus 20 and motive power generation apparatus 400 has been set to the parking range, the condition that there is no history of the process of meshing.

The process of meshing is the process described later herein in connection with steps S70 to S90. Once the process of meshing is executed after the vehicle is set to the P range, one of the state where the parking pole correctly meshes with the parking gear and the state where the parking brake is applied is reached. Therefore, it is enough to execute the process of meshing once. Thus, when it is determined in step S50 that there is a history of the process of meshing, the procedure proceeds to step S110 so that the control returns to the main routine without executing the process of meshing.

In contrast, when it is determined in step S50 that there is no history of the process of meshing, the procedure proceeds to step S60. In step S60, the state of application of a foot brake of the vehicle by an operation of a driver or by cooperative control other than it is confirmed. When the foot brake is ON, the procedure proceeds from step S60 to step S110 so that the control returns to the main routine without executing the process of meshing, since movement of the vehicle will significantly create a driver's feeling of strangeness.

In contrast, when it is determined in step S60 that the foot brake is OFF, the procedure proceeds to step S70. In step S70, it is determined, from the current relative positional relationship between electric power reception unit 100 and electric power transmission unit 700, which is greater between a region located forward of the vehicle and a region located rearward of the vehicle in which the power reception unit can receive electric power from the power transmission unit (which of a forward movement and a rearward movement of the vehicle will make electric power reception unit 100 closer to electric power transmission unit 700). For example, an image of a camera or the like may be used to identify this relative positional relationship, or a power reception test may be conducted while a test power transmission is conducted to identify the relative positional relationship based on whether or not a power reception peak appears, and based on whether or not the vehicle is stopped while electric power reception unit 100 is approaching electric power transmission unit 700 by raising the strength of the received power to a limit.

When it is determined in step S70 that a forward allowance is larger than a rearward allowance, namely when a forward movement of the vehicle by a predetermined distance will make electric power reception unit 100 closer to electric power transmission unit 700 than a rearward movement of the vehicle by the predetermined distance, the procedure proceeds to step S80. Otherwise, the procedure proceeds to step S90. The predetermined distance here is an amount of movement corresponding to rotation of the parking gear by a pitch of the teeth of the gear.

In step S80, vehicle ECU 500 causes drive unit 420 to generate a predetermined drive force and thereby move the vehicle forward until the vehicle is stopped. Here, the vehicle may be stopped in such cases including for example the case where the vehicle cannot be moved further due to abutment of the wheel against a car stop, and the case where the parking gear meshes with the parking pole to thereby make output shaft 421 unable to rotate.

In contrast, in step S90, vehicle ECU 500 causes drive unit 420 to generate a predetermined drive force and thereby move the vehicle rearward until the vehicle is stopped. Here, the vehicle may be stopped in such cases including for example the case where the vehicle cannot be moved further due to abutment of the wheel against a car stop, and the case where the parking gear meshes with the parking pole to thereby make output shaft 421 unable to rotate.

After the process in step S80 or step S90 is completed, the procedure proceeds to step S100. In step S100, vehicle ECU 500 changes the history of the process of meshing into ON.

The distance by which the vehicle is moved in step S80 or step S90 is restricted to the distance corresponding to an interval between a tooth and a tooth of the parking gear. In the case where the vehicle is not moved due to the parking brake or due to a wheel stop, in spite of the fact that drive unit 420 has generated a predetermined drive force, the control is ceased. In this case, even if the vehicle is not moved, the vehicle can receive electric power since electric power reception unit 100 is located within a range where it can receive electric power.

In the case where the vehicle is moved in step S80 or S90, the driver may be informed, before the vehicle is moved, of the information regarding the movement operation. Instead of causing drive unit 420 to automatically generate a drive force, the direction in which the vehicle is to be moved may be indicated to the driver to guide the vehicle.

In the above-described embodiment, if there is no history of the process of meshing, the drive unit of the vehicle is caused to generate a drive force in an attempt to move the vehicle in the direction of reducing a positional misalignment, regardless of whether the parking gear meshes with the parking pole. In the case, however, where the fact that the parking gear is in the state of meshing can be confirmed (in the case where the state of meshing is detected by a sensor or the like), the process of meshing may not be executed. The effects achieved in this case include the improvement in durability of hardware (improvement in life of the parts), the improvement of fuel economy obtained from failure to perform useless operations, and reduction of the tremor of the vehicle, for example.

Regarding how to confirm that the parking gear is in the meshing state, a sensor detecting the rotational angle of the parking pole may be provided or a sensor detecting the position of the teeth of the parking gear may be provided to detect, based on the outputs of these sensors, that the top land of a tooth of the parking gear and the protrusion of the parking pole abut against each other (or that the valley between a tooth and a tooth of the gear well meshes with the protrusion of the parking pole).

It is intended that the embodiments disclosed herein may be appropriately combined to be carried out. It should be construed that the embodiments disclosed herein are given by way of illustration in all respects, not by way of limitation. It is intended that the scope of the present invention is defined by claims, not by the above description of the embodiments, and encompasses all modifications equivalent in meaning and scope to the claims.

REFERENCE SIGNS LIST 10 vehicle; 12 motive power transmission gear; 14 differential gear; 15R, 15L driveshaft; 16 wheel; 16R, 16L drive wheel; 18 planetary gear; 20 electric power transmission apparatus; 24 engine; 32 voltage boost converter; 34, 36 inverter; 100 electric power reception unit; 200 rectification unit; 202 actuator; 204 encoder; 206 parking lock mechanism; 210 relay; 230 non-P position; 242 detent spring; 244 parking gear; 246 parking pole; 254 detent plate; 300 power storage device; 310 system main relay; 400 motive power generation apparatus; 410 motive power transmission mechanism; 420 drive unit; 421 output shaft; 500 vehicle ECU; 510, 810 communication apparatus; 520 informing apparatus; 600 power supply unit; 700 electric power transmission unit; 800 power supply ECU; 900 external power supply; MG1 generator; MG2 motor.

The invention claimed is:

1. A vehicle comprising:
an electric power transmission and reception unit including at least one of an electric power reception unit wirelessly receiving electric power from an electric power transmission apparatus and an electric power transmission unit wirelessly transmitting electric power to an electric power reception apparatus;
a motive power generation apparatus generating on an output shaft a drive force for moving the vehicle; and
a control apparatus controlling said motive power generation apparatus,
said motive power generation apparatus including:
a parking gear provided on said output shaft;
a parking pole having a protrusion to be fit in a groove of said parking gear; and
a drive unit outputting said drive force,
said control apparatus controlling said drive unit so that in a case:
where said electric power transmission and reception unit is located within an area in which electric power can be transmitted and received from and to an electric power transmission and reception apparatus including at least one of said electric power transmission apparatus and said electric power reception apparatus; and
where a predetermined condition is met including a condition that said motive power generation apparatus has been set to a parking range, said vehicle is moved in a direction that improves an efficiency of electric power reception and transmission between said electric power transmission and reception unit and said electric power transmission and reception apparatus.

2. The vehicle according to claim 1, wherein in a case where said output shaft is not rotated in spite of the fact that said predetermined condition is met and said drive unit is caused to output a predetermined drive force, said control apparatus stops said drive unit from outputting the drive force.

3. The vehicle according to claim 1, further comprising an informing apparatus informing a driver of the fact that said drive unit is to output a drive force when said predetermined condition is met and said drive unit is to be caused to output the drive force.

4. The vehicle according to claim 1, wherein a rotational amount by which said output shaft is rotated by a drive force output from said drive unit by said control apparatus in response to satisfaction of said predetermined condition is equal to or less than a rotational amount corresponding to a width of one tooth of said parking gear.

5. The vehicle according to claim 1, further comprising a detector detecting a rotational angle of said parking pole, wherein
said control apparatus detects, based on said rotational angle, that a top land of a tooth of said parking gear and said protrusion of said parking pole abut against each other.

6. The vehicle according to claim 1, wherein
said control apparatus holds history information indicating whether or not there has been performed a process of causing said drive unit to output a drive force and thereby move said vehicle in a direction of causing said electric power transmission and reception unit to approach said electric power transmission and reception apparatus, in response to satisfaction of said predetermined condition, and
said predetermined condition includes a condition that said history information indicates that said process has not been performed.

* * * * *